(12) United States Patent
Ichikawa et al.

(10) Patent No.: US 9,466,957 B2
(45) Date of Patent: Oct. 11, 2016

(54) WIRE HARNESS

(75) Inventors: Hidehiro Ichikawa, Kosai (JP);
Masahiro Takamatsu, Kosai (JP);
Shigemi Hashizawa, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/233,578

(22) PCT Filed: Jul. 20, 2012

(86) PCT No.: PCT/JP2012/068501
§ 371 (c)(1),
(2), (4) Date: Jan. 17, 2014

(87) PCT Pub. No.: WO2013/012076
PCT Pub. Date: Jan. 24, 2013

(65) Prior Publication Data
US 2014/0151115 A1     Jun. 5, 2014

(30) Foreign Application Priority Data

Jul. 21, 2011   (JP) .................................. 2011-160138

(51) Int. Cl.
*H02G 3/04*   (2006.01)
*B60R 16/02*   (2006.01)

(52) U.S. Cl.
CPC ............ *H02G 3/04* (2013.01); *B60R 16/0207* (2013.01); *B60R 16/0215* (2013.01); *H02G 3/0468* (2013.01)

(58) Field of Classification Search
CPC .. B60R 16/0207; B60R 16/0215; H02G 3/04; H02G 3/0468

USPC ........................................................ 174/70 R
See application file for complete search history.

(56) References Cited

U.S. PATENT DOCUMENTS

| | | |
|---|---|---|
| 2002/0151213 A1 | 10/2002 | Aoki et al. |
| 2003/0121692 A1 | 7/2003 | Kato et al. |
| 2004/0108127 A1 | 6/2004 | Aoki et al. |
| 2005/0011687 A1 | 1/2005 | Yamaguchi et al. |
| 2007/0017591 A1 | 1/2007 | Barnhouse et al. |

FOREIGN PATENT DOCUMENTS

| | | |
|---|---|---|
| DE | 9204064.0 U1 | 7/1992 |
| DE | 102007020913 A1 | 11/2008 |
| EP | 1241054 A2 | 9/2002 |

(Continued)

OTHER PUBLICATIONS

Written Opinion dated Sep. 18, 2012 issued by the International Searching Authority in International Patent Application No. PCT/JP2012/068501 (PCT/ISA/237).
International Search Report dated Sep. 18, 2012 issued in International Application No. PCT/JP2012/068501 (Form PCT/ISA/210).

(Continued)

*Primary Examiner* — Timothy Thompson
*Assistant Examiner* — Paul McGee, III
(74) *Attorney, Agent, or Firm* — Sughrue Mion, PLLC

(57) ABSTRACT

A wire harness includes a tubular sheathing member that covers at least one conduction path, and at least one path-maintaining member that is formed in flat plate shape corresponding to a bent part formed by bending the sheathing member. A tape is wrapped around the path-maintaining member while the path-maintaining member is placed along the bent part.

4 Claims, 11 Drawing Sheets

(56) References Cited

FOREIGN PATENT DOCUMENTS

| JP | 08-178132 | A | | 7/1996 |
|---|---|---|---|---|
| JP | 2001-231126 | A | | 8/2001 |
| JP | 2003-29052 | A | | 1/2003 |
| JP | 2004-224156 | A | | 8/2004 |
| JP | 2007-166781 | A | | 6/2007 |
| JP | 2008-104304 | A | | 5/2008 |
| JP | 2008-130491 | A | | 6/2008 |
| JP | 2008130491 | A | * | 6/2008 |
| JP | 2011-28892 | A | | 2/2011 |
| JP | 2011028892 | A | * | 2/2011 |

OTHER PUBLICATIONS

Written Opinion issued Sep. 18, 2012 in International Application No. PCT/JP2012/068501 (Form PCT/ISA/237).
Office Action, issued on Jul. 7, 2015, by the Japanese Patent Office in counterpart Japanese Application No. 2011-160138.
Search Report dated Nov. 11, 2015, issued by the European Patent Office in counterpart European Application No. 12815418.4.
Office Action dated Oct. 30, 2015, issued by the State Intellectual Property Office of the People's Republic of China in counterpart Chinese Application No. 201280035684.8.

* cited by examiner

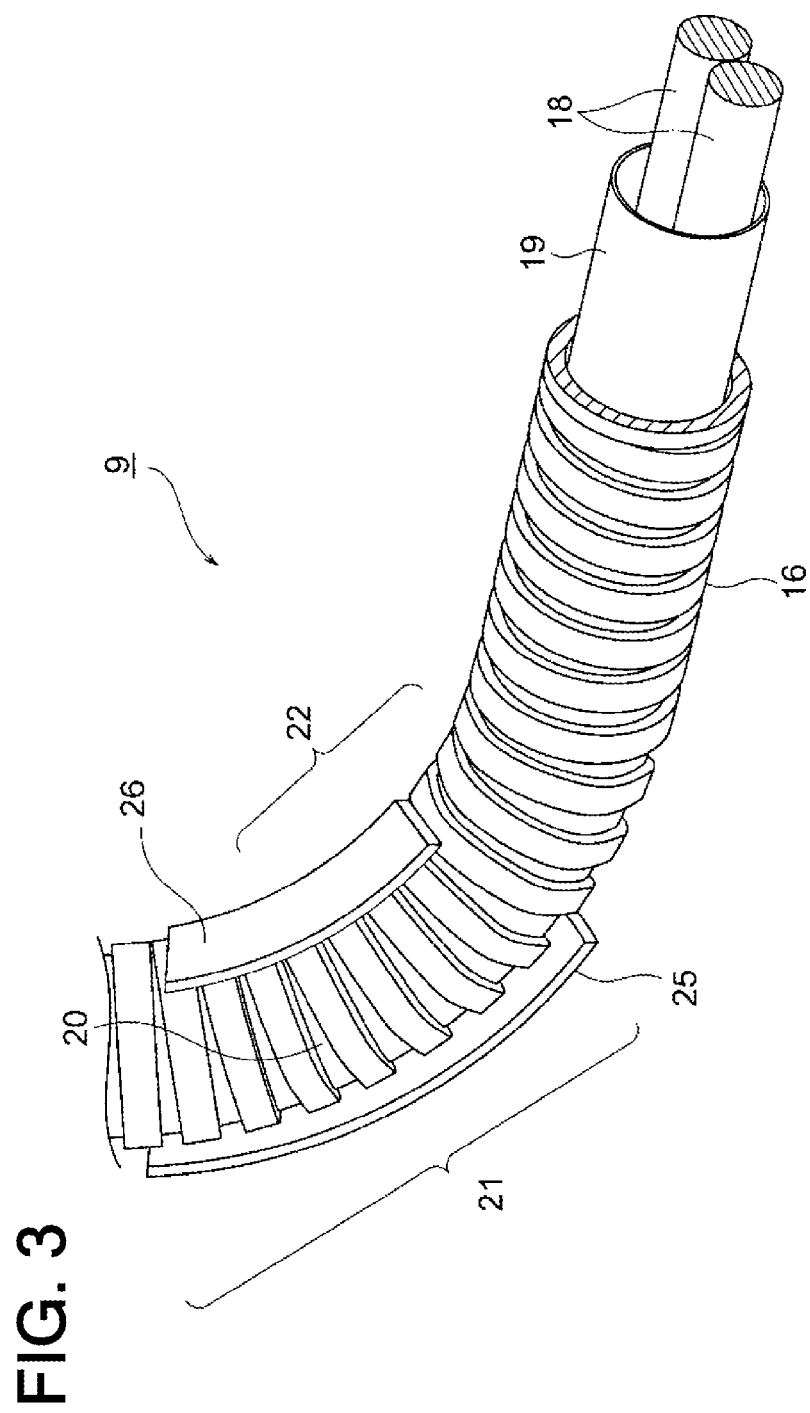

FIG. 4A
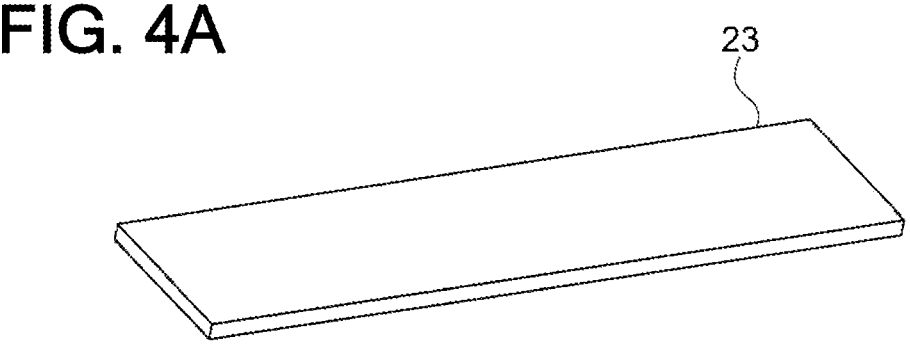
FIG. 4B1
FIG. 4B2
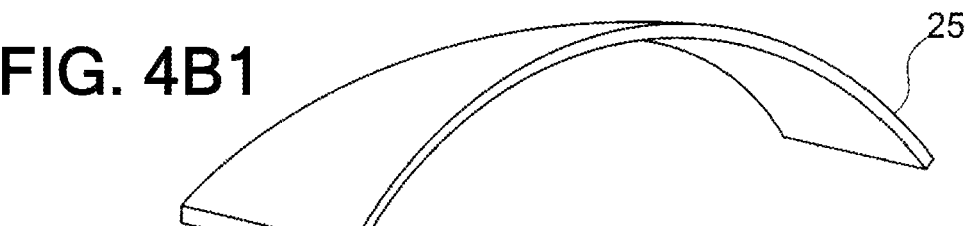
FIG. 4C1
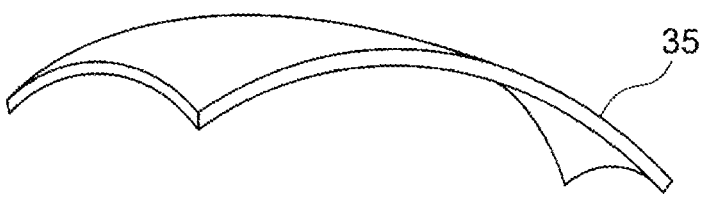
FIG. 4C2

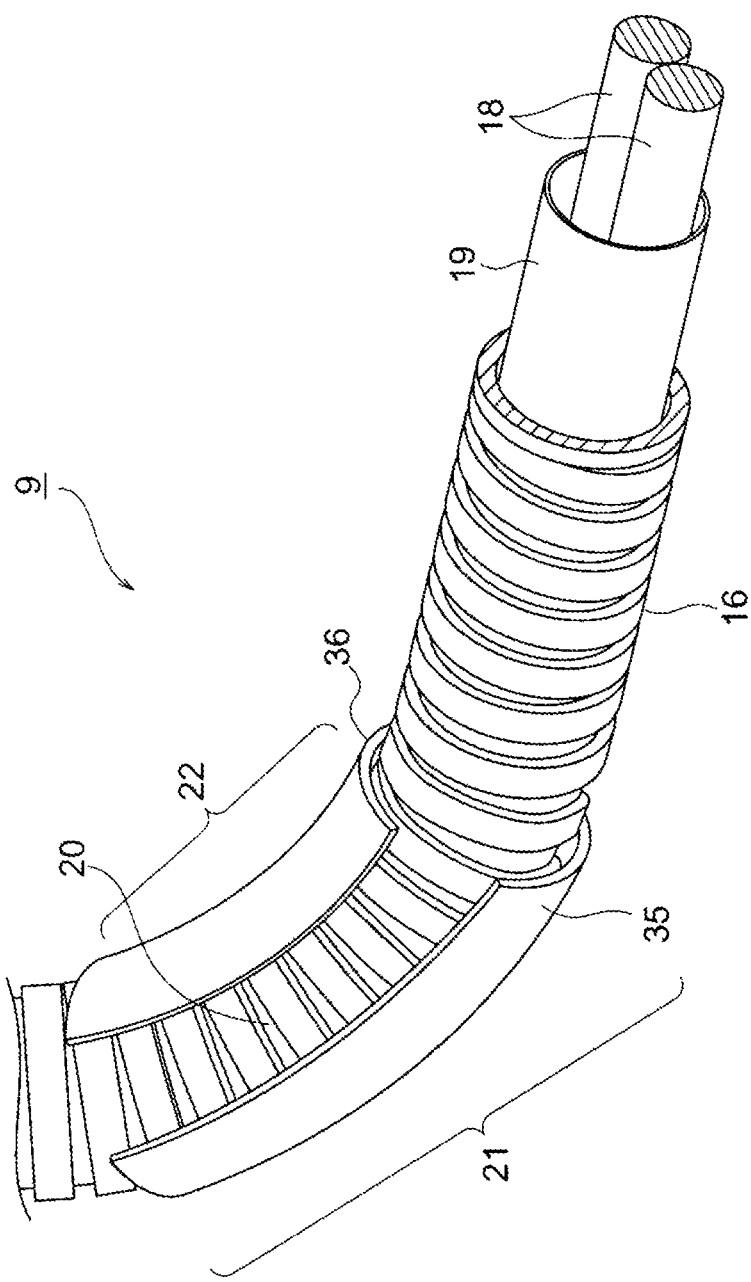

FIG. 10A1
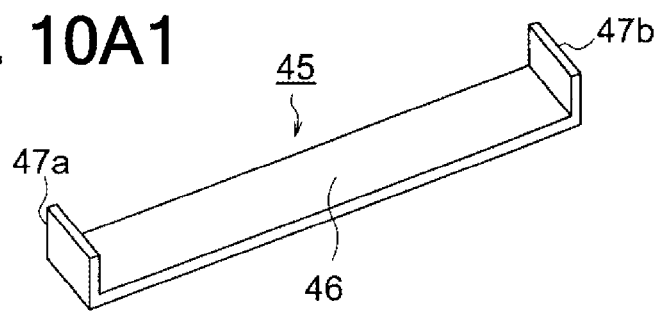
FIG. 10A2
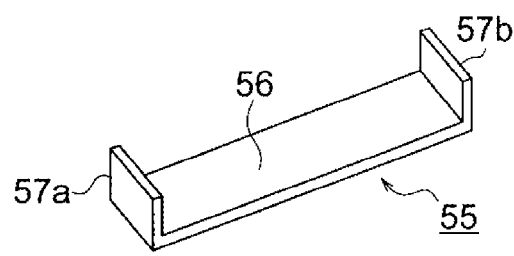

WIRE HARNESS

TECHNICAL FIELD

The invention relates, in general, to a wire harness

BACKGROUND ART

A wire harness disclosed in PTL 1 includes three high-voltage electric wires and three metal protection pipes which respectively receive the three high-voltage electric wires for protection.

The high-voltage electric wire connects a motor mounted at a front portion of a vehicle and an inverter mounted at a middle or rear portion of the vehicle. The high-voltage wire is arranged from a battery at the middle or rear portion of the vehicle to the motor at the front portion of the vehicle through an under-floor located outside a vehicle body frame.

The high-voltage wire arranged through the under-floor of the vehicle body may be hit by pebbles or splashed with water. To protect the high-voltage electric wires from pebbles or water, the high-voltage electric wires are surrounded by the metal protection pipes. Each of the metal protection pipes serves to protect the high-voltage electric wire from pebbles or water and to prevent the high-voltage electric wire from being bent using its rigidity. Furthermore, since the metal protection pipe is made of metal, the metal protection pipe serves as an electromagnetic shield.

The wire harness is manufactured by respectively inserting the three high-voltage electric wires through the straight metal protection pipes and then bending the metal protection pipes along an arranging path of the wire harness at an under-floor of a vehicle. The wire harness manufactured in a manner as described above is then transported from a wire harness manufactory to a vehicle manufacturer's assembling factory. Then, the wire harness will be mounted at a predetermined position in the vehicle, thereby completing the arranging process.

CITATION LIST

Patent Literature

PTL 1: JP-A-2004-224156

SUMMARY OF INVENTION

Technical Problem

According to the related art, there is a problem in that, when a plurality of wire harnesses are transported, a sufficient space is required between metal protection pipes and between wire harnesses in order to prevent the metal protection pipes from coming into contact with each other and being subjected to damage or deformation. Further, another problem arises in that a processing space is required because the metal protection pipe is bent in three dimensions.

In order to solve these problems, it is considered that a flexible tubular body is used in place of the metal protection pipe. However, the use of the tubular body has following problems.

In the case of flexible tubular body, it is difficult for the tubular body to maintain a desired shape when mounted/aligned and after arranged.

Further, in order to mount such a flexible tubular body at a predefined position of a vehicle, there is a need for a protector, for example. However, the protector is a member that is molded with resin to correspond to an arranging path of the wire harness, so the protector should be separately designed/provided for each vehicle, being of less generality and thus entailing high cost.

Further, in respect of the protector, during the development, it is required to fabricate a prototype mold many times, so the design and fabrication of the protector will be costly and time-consuming.

Further, since use of the protector causes a mounting part for the tubular body to be made larger, if provided at an under-floor of a vehicle, the protector is close to the ground, causing many problems.

Accordingly, the present invention has been made keeping in mind the above problems, and an object of the present invention is to provide a wire harness which can maintain an sheathing member in a desired shape.

Solution to Problem

In order to solve the problem, the present invention provides a wire harness (1) to (3) having the following characteristics.

(1) A wire harness includes a tubular sheathing member that covers at least one conduction path, and at least one path-maintaining member that is formed in flat plate shape corresponding to a bent part formed by bending the sheathing member. A tape is wrapped around the path-maintaining member while the path-maintaining member is placed along the bent part.

According to the configuration (1) of the wire harness, the path-maintaining member is placed along the bent section which is formed by bending the sheathing member and then the bend section is wrapped with the tape, thereby restricting the restoration force of the bent sheathing member and thus maintaining the sheathing member in a bent shape.

(2) In the wire harness of (1), the path-maintaining member has less flexibility than the sheathing member.

According to the configuration (2) of the wire harness, the restoration force of the sheathing member is more effectively restricted, so that the sheathing member is maintained in a bent shape.

(3) In the wire harness of (1), a width of the path-maintaining member in a diametric direction of the sheathing member is smaller than a width of the sheathing member in the diametric direction.

According to the configuration (3) of the wire harness, an adhering feature of the tape with respect to the sheathing member is improved, so that after wrapping of the tape, a misalignment between the path-maintaining member and the sheathing member hardly occurs. Thus, the bent shape of the bend section is securely maintained.

BRIEF DESCRIPTION OF DRAWINGS

FIG. 3 is a perspective view showing the state where a path-maintaining member is placed along a bend section of the wire harness after bent.

FIG. 4A is a perspective view showing the exterior of a flat plate before formed into a path-maintaining member.

FIG. 4B1 is a perspective view showing the exterior of an exemplary outer path-maintaining member, FIG. 4B2 is a perspective view showing the exterior of an exemplary inner path-maintaining member, FIG. 4C1 is a perspective view showing the exterior of a modified-type outer path-maintaining member, and FIG. 4C2 is a perspective view showing the exterior of a modified-type inner path-maintaining member.

FIG. 7 is a perspective view showing a modified embodiment of the wire harness in which the path-maintaining member is placed along the bend section after the wire harness is bent.

FIG. 10A1 is a perspective view showing another modified embodiment of the outer path-maintaining member, FIG. 10A2 is a perspective view showing another modified embodiment of the inner path-maintaining member.

DESCRIPTION OF EMBODIMENTS

An embodiment of a wire harness of the present invention will now be described in detail with reference to FIGS. 1 to 6B.

Figure 1:
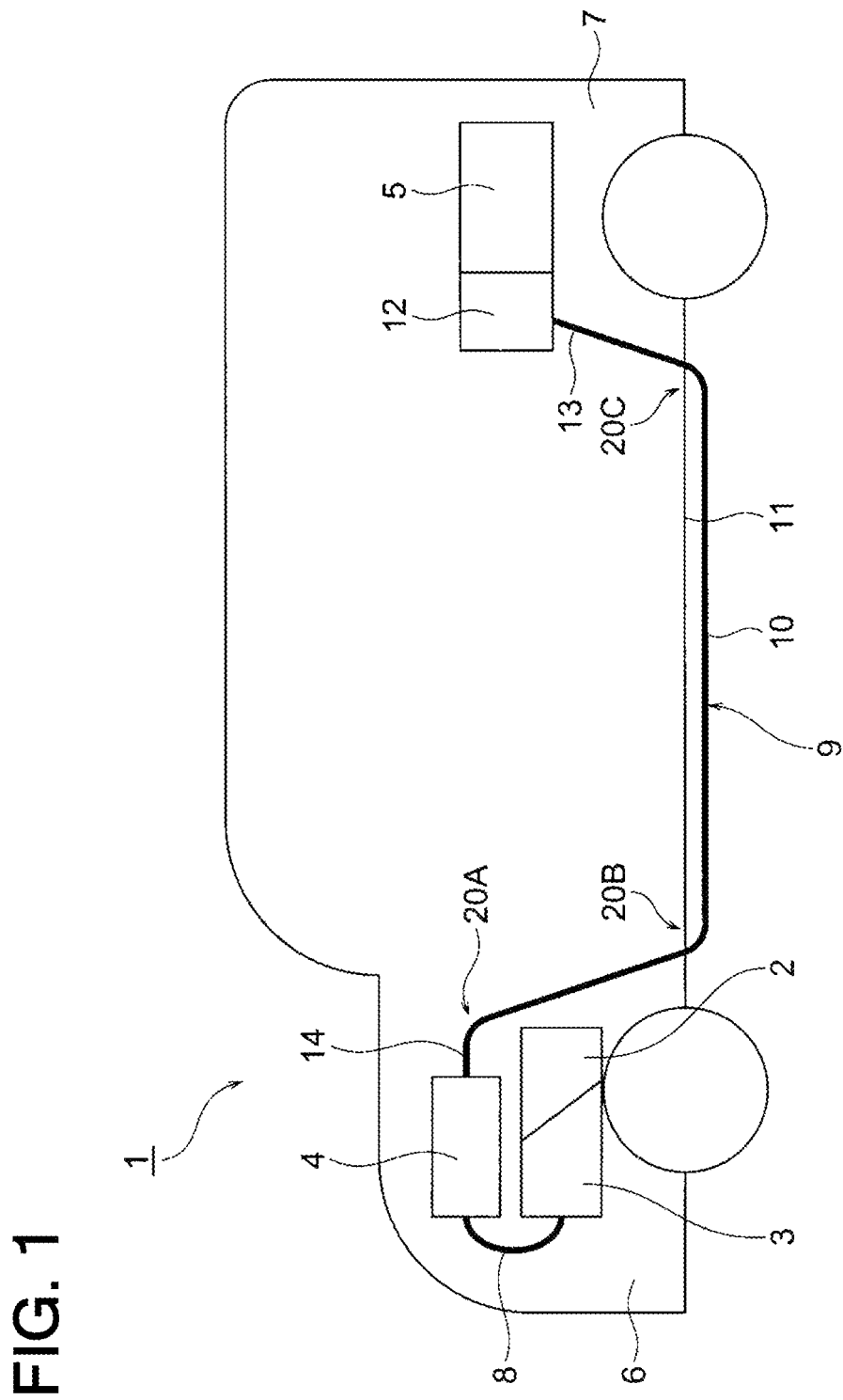
FIG. 1 is a schematic view showing an example of a wire harness according to an embodiment of the present invention, which is arranged in a hybrid vehicle.
Figure 2:
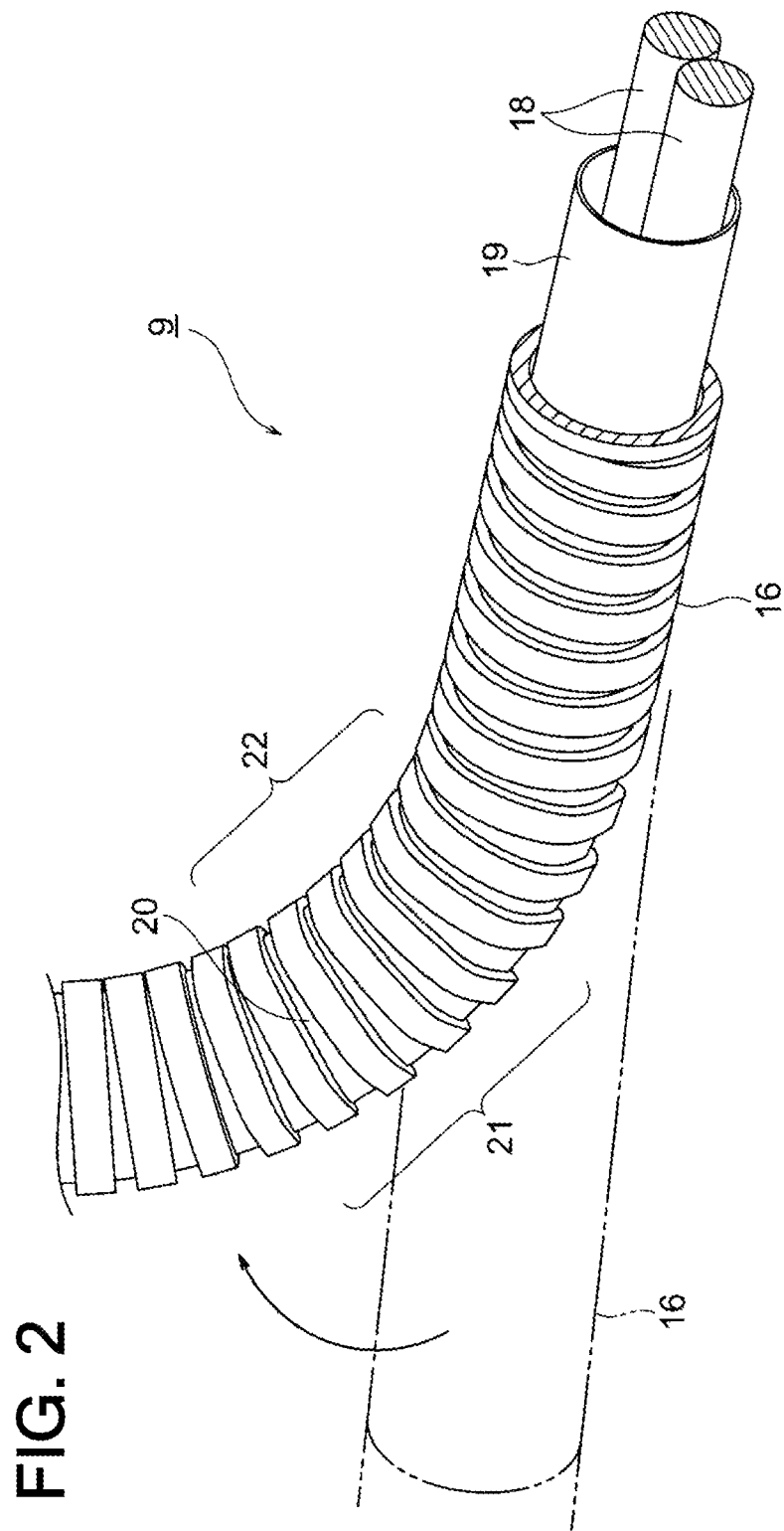
FIG. 2 is a perspective view showing the exterior of the wire harness that has been bent from an initial state.
Figure 5:
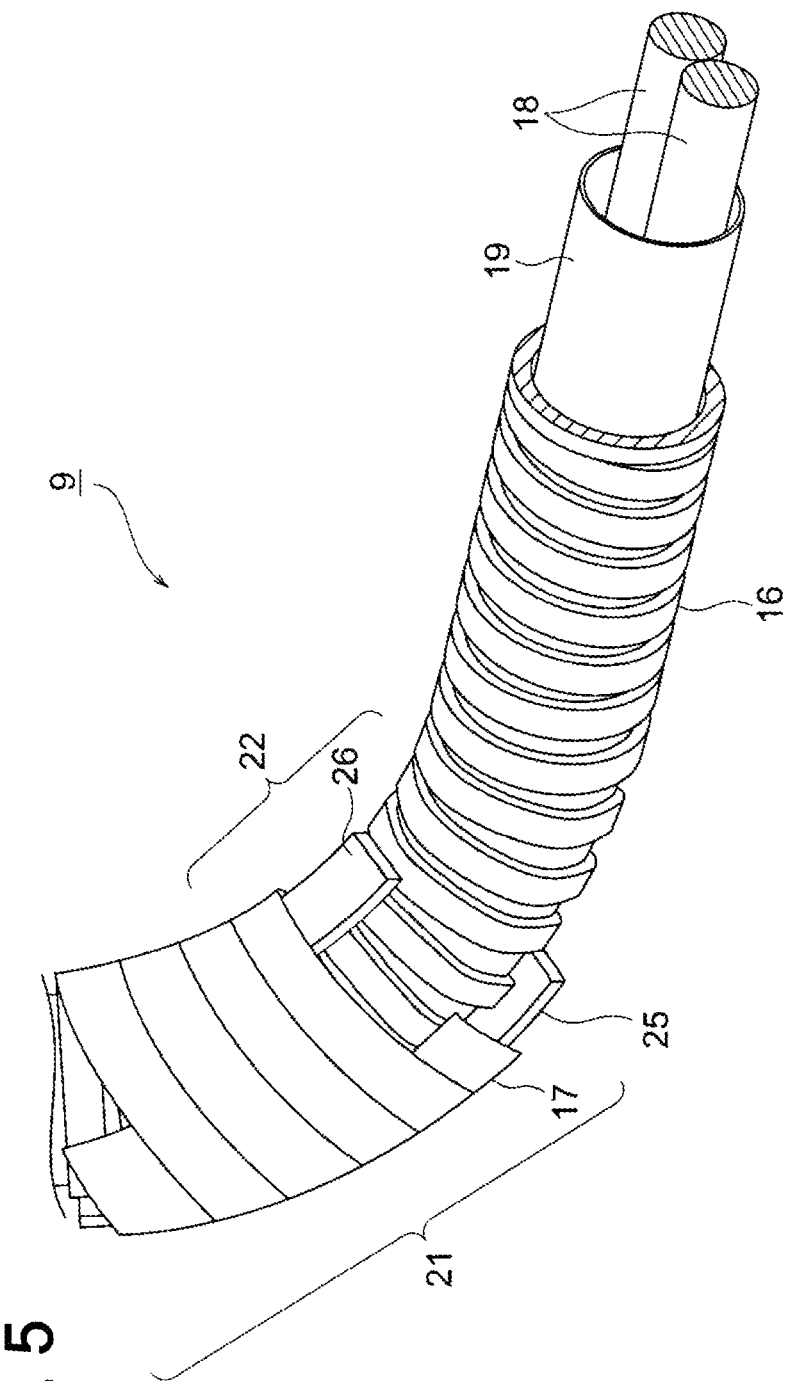
FIG. 5 is a perspective view showing the exterior of the wire harness in which a tape is wrapped around the bend section.
Figure 6A:
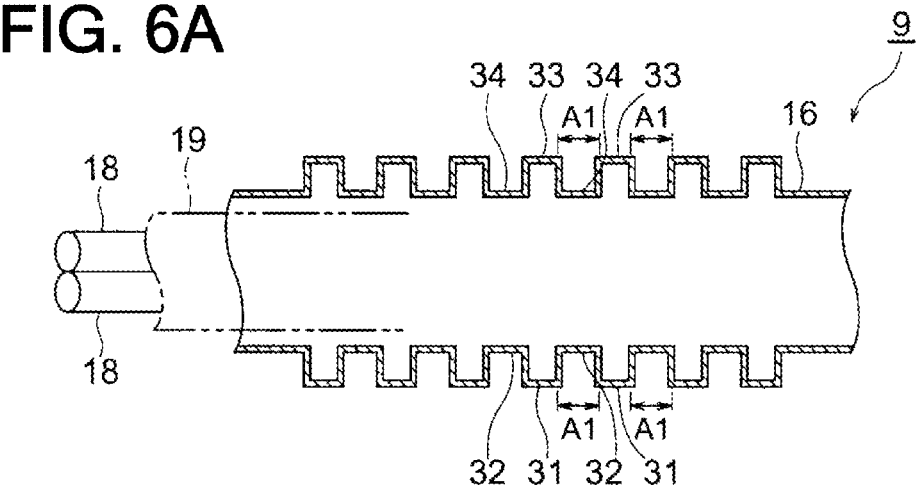
FIG. 6A is a view of longitudinal section showing a wire harness before a corrugated tube is bent.
Figure 6B:
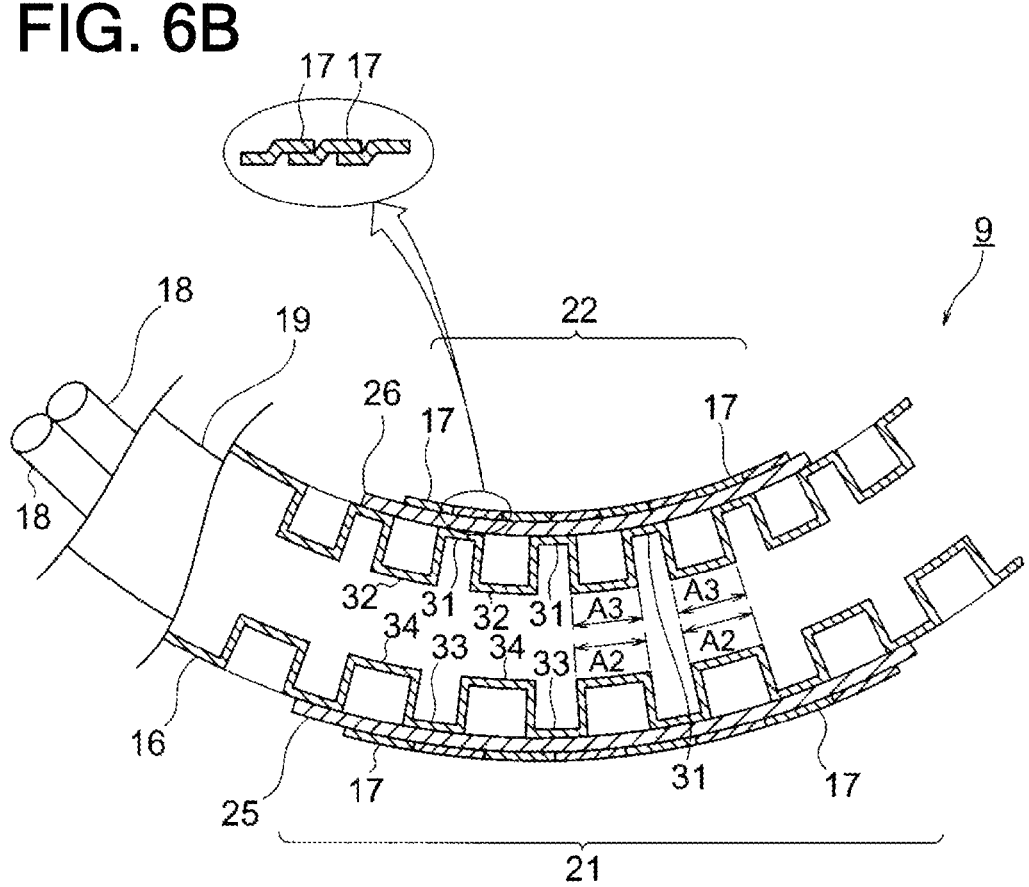
FIG. 6B is a view of longitudinal section showing the wire harness in which a tape is wrapped around a bend section against which a path-maintaining member is placed up after the corrugated tube is bent.

FIG. 1 is a schematic view showing an example of a wire harness according to an embodiment of the present invention, which is arranged in a hybrid vehicle. FIG. 2 is a perspective view showing the exterior of the wire harness that has been bent from an initial state. FIG. 3 is a perspective view showing the state where a path-maintaining member is placed along a bend section of the wire harness after bent. FIG. 4A is a perspective view showing the exterior of a flat plate before formed into a path-maintaining member, FIGS. 4B1 and 4B2 are perspective views showing the exterior of exemplary path-maintaining members which have been formed, and FIGS. 4C1 and 4C2 are perspective views showing the exterior of modified-type path-maintaining members which have been formed. FIG. 5 is a perspective view showing the exterior of the wire harness in which a tape is wrapped around the bend section. FIG. 6A is a view of longitudinal section showing a wire harness before a corrugated tube is bent, and FIG. 6B is a view of longitudinal section showing the wire harness in which a tape is wrapped around a bend section against which a path-maintaining member is placed up after the corrugated tube is bent.

According to the present embodiment, an example of the wire harness which is applied to a hybrid vehicle (or an electric vehicle) will be described.

In FIG. 1, the hybrid vehicle 1 is a vehicle that is driven by combined power from an engine 2 and a motor unit 3. The motor unit 3 is supplied with power from a battery 5 (or a battery pack) via an inverter unit 4. The engine 2, the motor unit 3, and the inverter unit 4 are mounted to an engine room 6 on the side of front wheels or the like. The battery 5 is mounted to a rear portion 7 of the vehicle on the side of rear wheels or the like (the battery may be mounted to the interior of the vehicle which is located on the rear side of the engine room 6).

The motor unit 3 and the inverter unit 4 are connected by a high-voltage wire harness 8 known in the related art. The inverter unit 4 and the battery 5 are connected by a high-voltage wire harness 9 according to an embodiment of the present invention.

The wire harness 9 and the battery 5 are connected together via a junction block 12 which is provided to the battery 5. A rear end 13 of the wire harness 9 is coupled to the junction block 12 via a connector. The rear end 12 of the wire harness 9 is arranged on the floor on the side of the interior of the vehicle. A front end 14 of the wire harness 9 is also arranged on the floor. The front end 14 of the wire harness 9 is coupled to the inverter unit 4 via a connector. An middle portion 10 between the front end 14 and the rear end 13 of the wire harness 9 is arranged along an under-floor of a vehicle body.

The motor unit 3 includes a motor (not shown) and a generator (not shown). The inverter unit 4 includes an inverter (not shown) and a converter (not shown). The motor unit 3 is formed as a motor assembly which includes a shield casing (not shown). The inverter unit 4 is also formed as an inverter assembly which includes a shield casing. The battery 5 is a Ni—NH battery or a lithium-ion battery which is modulated. Meanwhile, it is possible to employ a storage device such as a capacitor. If applicable to a hybrid vehicle or an electric vehicle, the battery 5 may not be limited to a specified type.

An exemplary structure of the wire harness 9 will now be described in detail with reference to FIGS. 2 to 5, and 9.

The wire harness 9 includes two electric wires 18, an electromagnetic shield 19 which shields the two electric wires in a lump, and a corrugated tube 16 which is provided outside the electromagnetic shield 19 as an sheathing member so as to cover the electromagnetic shield 19.

The electric wire 18 is a conduction path including a conductor and an insulator, and is formed so as to have a sufficient length required for electrical connection. Connectors are respectively provided at both ends of the electric wire 18, and are connected to connectors of the junction block 12 (FIG. 1) and the inverter unit 4 (FIG. 1), respectively. The conductor is made of copper, copper alloy, aluminum, aluminum alloy or the like. Although the conductor has a conductive structure which is formed by twisting strands, the conductor may be a rod-type conductive structure which has a rectangular section or a circular section (e.g., a flat-type single core structure or a circular-type single core structure, in which case the electric wire itself also has a rod-like shape).

Although this embodiment illustrates two electric wires 18 as a conduction path, the number of the electric wires 18 is not limited to 2, and the conduction path is not limited to the electric wire. For example, the present invention may employ a high-voltage conduction path in which an insulator is provided on a known bus-bar, or a combined-type high-voltage coaxial conduction path in which n circuit sections are coaxially formed into a single circuit unit.

The electromagnetic shield 19 is a member which prevents an electric signal transmitted via the electric wire 18 from being influenced from an external electromagnetic wave. The electromagnetic shield has a barrel-type form which is composed of a shield member having a conductive metal foil or a single body of metal foil. The electromagnetic shield 19 has the substantially same length as the whole length of the two electric wires 18.

Although the electromagnetic shield 19 includes a metal foil in this embodiment, the present invention is not limited thereto. For example, if having the electromagnetic shielding effect, the electromagnetic shield may be formed of braid which has thin conductive strands. Here, the braid has a conduction path and is formed into a barrel-type shape.

The corrugated tube 16 is a flexible tubular sheathing member (tubular body) which has bendable flexibility. The corrugated tube is a resinous or metal tube (a corrugated box tube) which has an irregular portion (recessed sections and protruded sections) which is continuously formed on the outer circumferential surface in the longitudinal direction of the electric wire 18. That is, the corrugated tube 16 is alternately provided, in the longitudinal direction thereof, with recessed sections and protruded sections which circumferentially extend, as shown in FIG. 4A. An upper surface of the protruded section is formed on a circumferential surface of a sectional surface which is parallel with a central axis of the corrugated tube 16, wherein the circumferential surface extends parallel with the central axis. Although the corrugated tube 16 is made of resin and has a circular sectional shape in this embodiment, the corrugated tube is not limited to the circular sectional shape, but may have other sectional shapes such as an oval, a rectangle or the like.

Referring again to FIG. 2, when the corrugated tube 16 is bent in the direction of arrow shown in FIG. 2 in a state where the electromagnetic shield 19 covering the electric wires 18 is inserted through the corrugated tube 16 (i.e. when the corrugated tube is bent from the state shown with imaginary line in FIG. 2), a bent part 20 (or a bend) is formed. As shown in FIG. 1, the bent part 20 of the wire harness 9 consists of bent parts 20A, 20B, and 20C which turn from the interior of a vehicle towards the inverter unit 4; from the under-floor 11 of the vehicle towards the interior of the vehicle; and from the interior of the vehicle towards the under-floor 11, respectively.

The bent part 20 is a bend of the wire harness 9 as well as the corrugated tube 16. Reference numeral 21 designated in the bent part 20 indicates an outer curvature portion where the curvature (R) is large. Reference numeral 22 indicates an inner curvature portion where the curvature (R) is small.

The path-maintaining member 25 is a member which serves to maintain a bent shape of the outer curvature portion 21 of the bent part 20 as shown in FIG. 3, and thus maintain a path of the wire harness 9. The path-maintaining member 25 is formed by bending a planar member 23 (see FIG. 4A), which has less flexibility than the corrugated tube 16, into a shape having a substantially U-shaped longitudinal section (see FIG. 4B1). The shape of the longitudinal section is not limited to the substantially U-type shape if the shape corresponds to the bent shape of the outer curvature portion 21. The planar member 23 is bent by applying a predefined pressure to both longitudinal ends of the planar member 23. The path-maintaining member 25 is placed along the outer curvature portion 21 as a brace.

Meanwhile, the planar member 23 is formed so as to have a constant thickness by means of an extrusion molding method using an extrusion die (not shown) if made of metal having less flexibility than the corrugated tube 16. Further, the material of the planar member 23 may be resin having less flexibility than the material of the corrugated tube 16. In this case, the planar member is formed so as to have a constant thickness by means of an injection molding method.

The path-maintaining member 26 is a member which serves to maintain a bent shape of the inner curvature portion 22 of the bent part 20, and thus maintain a path of the wire harness 9. The path-maintaining member 26 is formed by bending a flexible planar member 23 into a shape having a substantially U-shaped longitudinal section (see FIG. 4B2). The path-maintaining member 26 is placed along the inner curvature portion 22 as a brace. The bending method is the same as the above-mentioned method, so a description thereof will be omitted.

Although this embodiment has illustrated that the two path-maintaining members 25 and 26 are place along the outer and inner curvature portions 21 and 22, respectively, the following effect can be obtained even with the configuration in which only one of the path-maintaining members 25 and 26 is placed along either outer or inner curvature portion 21 or 22.

A tape 17 is wrapped around the path-maintaining members 25 and 26, which are respectively placed along the outer curvature portion 21 and the inner curvature portion 22 after the corrugated tube 16 has been bent, in the longitudinal direction of the corrugated tube 16 (see FIG. 5). Meanwhile, an adhesive is applied to one side of the tape 17. With the tape 17 wrapped around the entire surface of the bent part 20, the path-maintaining members 25 and 26 are fixed to the surfaces of the outer curvature portion 21 and the inner curvature portion 22, respectively, thereby maintaining the corrugated tube 16 in a bent shape.

Figure 9A:
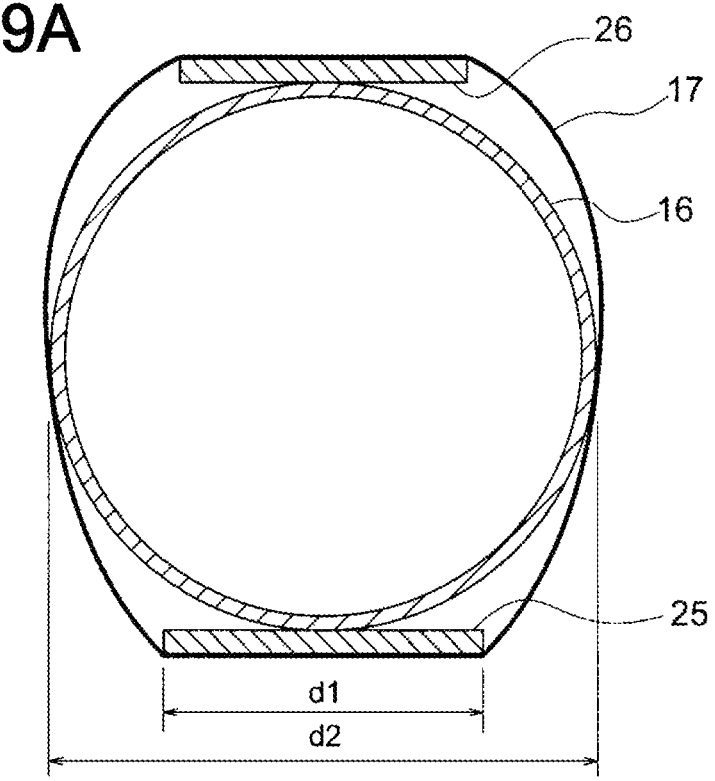
FIG. 9A is a widthwise sectional view of a wire harness in which a tape is wrapped around a bend section thereof.

The path-maintaining members 25 and 26 each have a width d1 which is smaller than a diameter d2 of the corrugated tube 16 in order to bond the tape 17 to the corrugated tube 16 (see FIG. 9A). That is, the width of the path-maintaining members 25 and 26 in the diametric direction of the corrugated tube 16 is smaller than the width of the corrugated tube 16 in the diametric direction.

Further, the tape 17 is wrapped around the bent part 20 using a so-called half-lapping method in which, whenever the tape is wrapped one turn around the circumference of the corrugated tube 16, the tape overlaps partly with the just previously wrapped turn [see the enlarged view of FIG. 6B].

The principle that the shape of the bent part 20 can be maintained will be described in detail with reference to FIGS. 6A and 6B.

In a state where the corrugated tube 16 is not yet bent (see FIG. 6A), no force is applied to the corrugated tube 16, so that the a distance (i.e. the pitch A1) between adjoining protruded sections 33 on the upper side of the corrugated tube is the same as a distance (i.e. the pitch A1) between adjoining protruded sections 31 on the lower side of the corrugated tube.

When the corrugated tube 16 is bent, a distance (i.e. the pitch A2) between adjoining protruded sections 33 on the outer curvature portion 21 of the corrugated tube 16 becomes larger than the pitch A1. Further, a distance (i.e. the pitch A3) between adjoining protruded sections 31 on the inner curvature portion 22 of the corrugated tube 16 becomes smaller than the pitch A1. That is, the corrugated tube 16 elongates at the outer curvature portion 21 in the longitudinal direction thereof, and at the same time, contracts at the inner curvature portion in the longitudinal direction.

Here, if a person bends the corrugated tube 16 with his hands and then releases his hold on the corrugated tube, the corrugated tube 16 returns to its initial straight state as shown in FIG. 5A, which is not yet bent, under the action of the restoration force. That is, the wire harness 9 returns to its straight shape, so that the bent shape of the wire harness is not maintained.

Thus, according to the present embodiment, as described before, the tape 17 is wrapped around the corrugated tube 16 in the longitudinal direction of the corrugated tube while the path-maintaining members 25 and 26 are placed along the outer curvature portion 21 and the inner curvature portion 22, respectively. Then, the distance (the pitch A2) between the adjoining protruded sections 33 on the outer curvature portion 21 of the corrugated tube 16 is maintained. Meanwhile, the distance (the pitch A3) between the adjoining protruded sections 31 on the inner curvature portion 22 of the corrugated tube 16 is also maintained.

As described before, in the wire harness 9 according to the present embodiment, it is difficult for the distance A2 on the outer curvature portion 21 and the distance (A3) on the inner curvature portion 22 to return to the distance A1. Thus, the distances between the adjoining protruded sections 33 and 31 which are disposed on the outer and inner curvature portions 21 and 22, respectively, can be maintained constant. Thus, the bent part 20 (or the path) of the corrugated tube 16 can be maintained in a bent shape.

Modified embodiments of the wire harness 9 will now be described with reference to FIGS. 7 to 9B. Here, like elements of these modified embodiments are indicated by like reference numerals of the former embodiments, and a detailed description thereof will be omitted.

A wire harness 9, a corrugated tube 16, a bent part 20, an outer curvature portion 21, and an inner curvature portion 22 are the same as those elements of the former embodiment.

Figure 8:
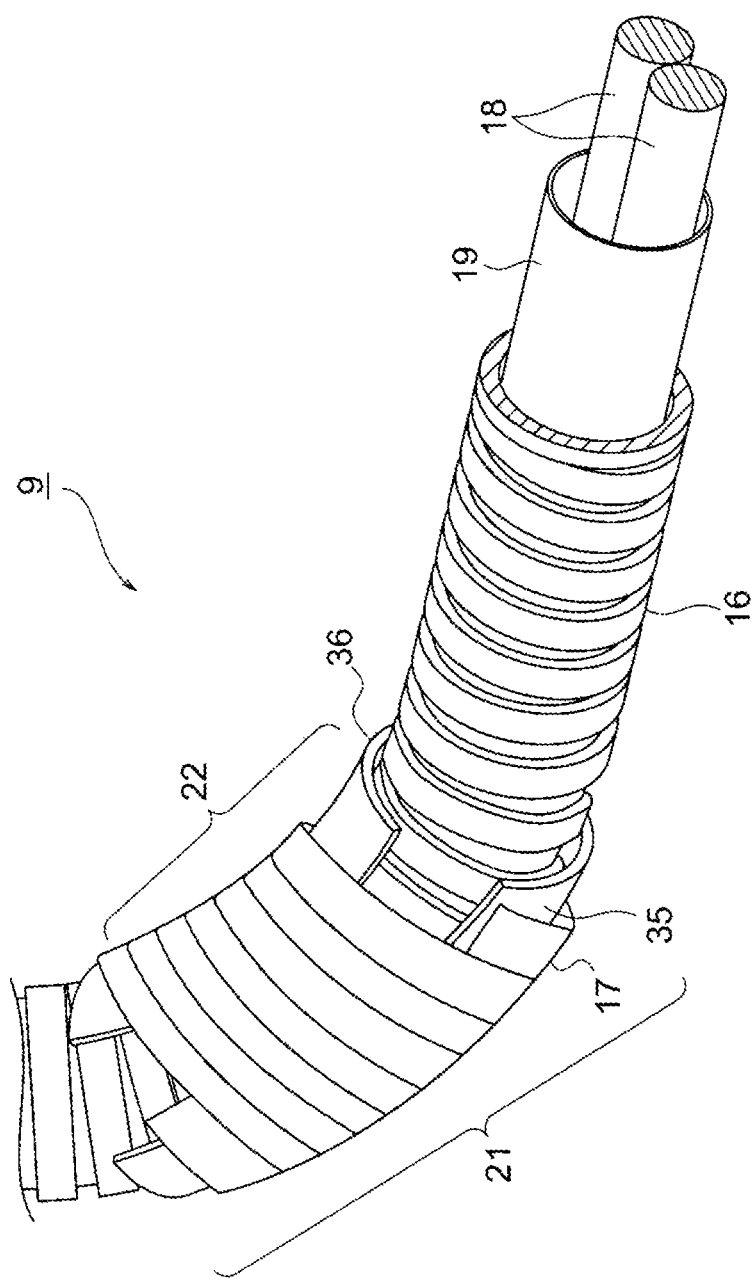
FIG. 8 is a perspective view showing a modified embodiment of the wire harness in which the tape is wrapped around the bend section.
Figure 9B:
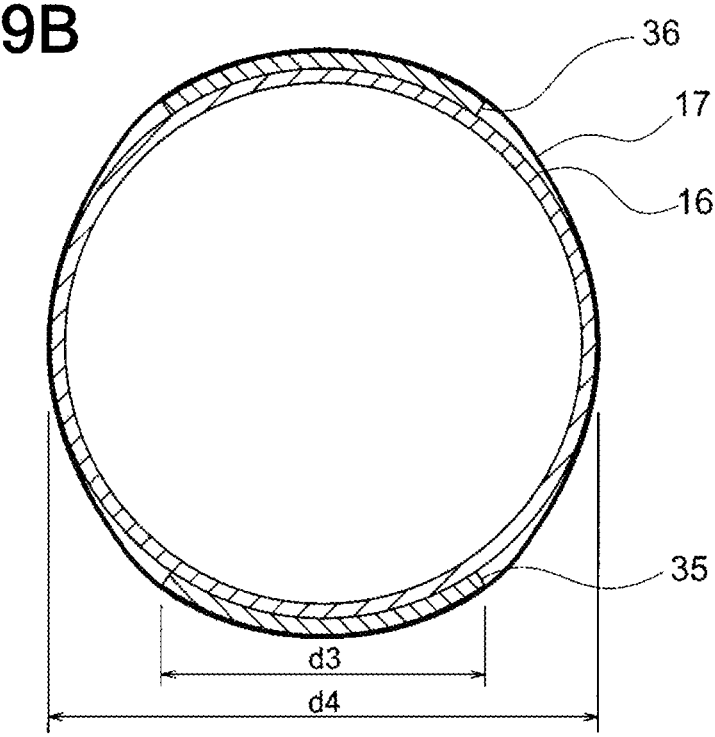
FIG. 9B is a widthwise sectional view of a modified embodiment of the wire harness in which the tape is wrapped around the bend section.

Here, FIG. 7 is a perspective view showing a modified embodiment of the wire harness in which a path-maintaining member is placed along the bent part after the wire harness is bent. FIG. 8 is a perspective view showing a modified embodiment of the wire harness in which a tape is wrapped around the bent part. FIG. 9A is a widthwise sectional view showing an example of a wire harness in which a tape is wrapped around a bent part thereof, and FIG. 9B is a widthwise sectional view of a modified embodiment of the wire harness in which a tape is wrapped around a bent part.

A path-maintaining member 35 shown in FIG. 7 is a member which serves to maintain a bent shape of the bent part 20, and thus maintain a path of the wire harness 9. The path-maintaining member is formed by bending a flexible planar member 23 into a bent shape having substantially U-shaped longitudinal and widthwise sections (see FIG. 4C1). The path-maintaining member 35 is placed along the outer curvature portion 21 as a brace.

A path-maintaining member 36 shown in FIG. 7 is a member which serves to maintain a bent shape of the bent part 20, and thus maintain a path of the wire harness 9. The path-maintaining member is formed by bending a flexible planar member 23, which is not stretched, into a bent shape having substantially U-shaped longitudinal and widthwise sections (see FIG. 4C2). The path-maintaining member is placed along the inner curvature portion 22 as a brace. The material of the planar member 23 is the same as that described before, so a description thereof will be omitted.

Although this modified embodiment has illustrated that the two path-maintaining members 35 and 36 are place along the outer and inner curvature portions 21 and 22, respectively, the following effect can be obtained even with the configuration in which only one of the path-maintaining members 35 and 36 is placed along any of curvature-deformed portions.

A tape 17 is wrapped around the path-maintaining members 35 and 36, which are respectively placed along the outer curvature portion 21 and the inner curvature portion 22 after the corrugated tube 16 has been bent, in the longitudinal direction of the corrugated tube 16 (see FIG. 8).

The path-maintaining members 35 and 36 each have a width d3 which is smaller than a diameter d4 of the corrugated tube 16 in order to bond the tape 17 to the corrugated tube 16 (see FIG. 9B).

As compared to the former embodiment, the present modified embodiment is configured such that the path-maintaining members 35 and 36 is formed to have the widthwise section having a substantially U-shape. Thus, this configuration improves the adhesion of the path-maintaining members with respect to the surface of the bent part 20 of the corrugated tube 16, thereby securely maintaining the bent shape (or the path) of the corrugated tube.

Another modified embodiment of the wire harness 9 will now be described with reference to FIG. 10. Here, like elements of this modified embodiment are indicated by like reference numerals of the former embodiments, and a detailed description thereof will be omitted. The present modified embodiment is the same as the former embodiments, except that a path-maintaining member 45 has a different shape.

Figure 10B:
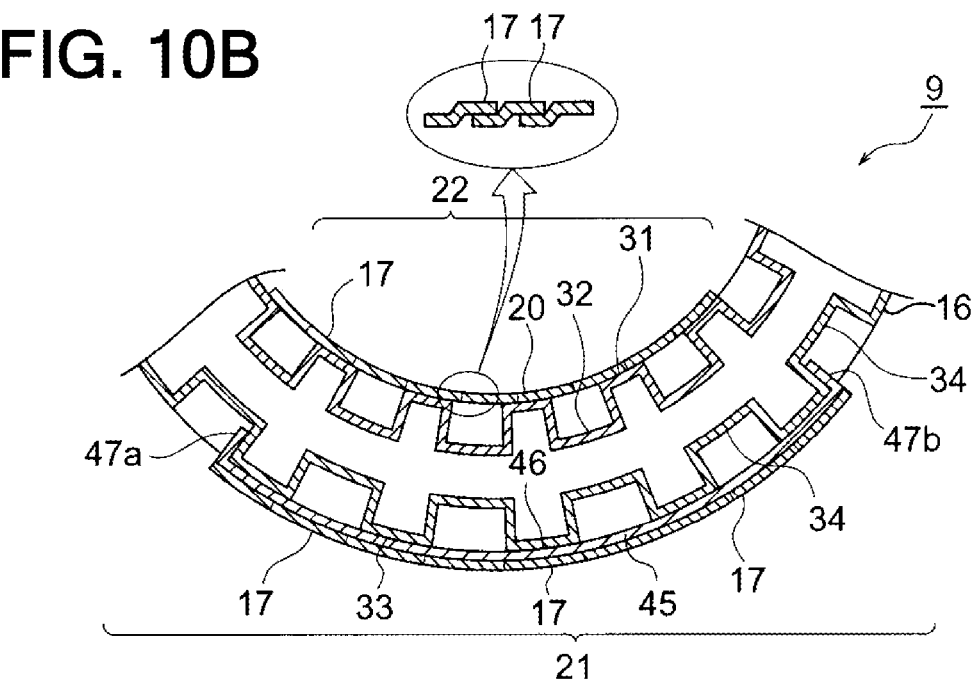
FIG. 10B is a longitudinal sectional view of a wire harness in which a tape is wrapped around a path-maintaining member which has been fitted into a recessed section of a corrugated tube on the outer side thereof after the corrugated tube is bent.
Figure 10C:
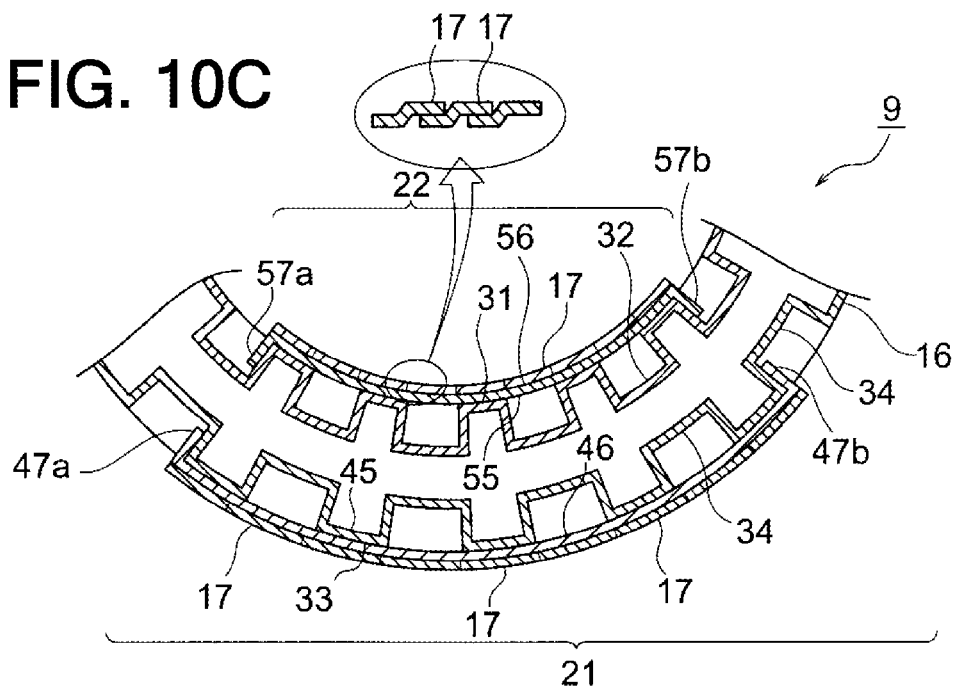
FIG. 10C is a longitudinal sectional view of a wire harness in which a tape is wrapped around a path-maintaining member which has been fitted into recessed sections of a corrugated tube on the outer and inner sides thereof after the corrugated tube is bent.

Here, FIGS. 10A1 and 10A2 are perspective views showing another modified embodiment of the path-maintaining member, FIG. 10B is a longitudinal sectional view of a wire harness in which a tape is wrapped around the path-maintaining member which has been fitted into a recessed section of a corrugated tube on the outer side thereof after the corrugated tube is bent, and FIG. 10C is a longitudinal sectional view of a wire harness in which a tape is wrapped around a path-maintaining member which has been fitted into recessed sections of a corrugated tube on the outer and inner sides thereof after the corrugated tube is bent.

A path-maintaining member 45 shown in FIG. 10A1 is intended to be secured to the outer curvature portion 21, and a path-maintaining member 55 is intended to be secured to the inner curvature portion 22. The path-maintaining members 45 and 55 each have a substantially U-shape. The path-maintaining member 45 consists of a base portion 46 and arm portions 47*a* and 47*b,* and the path-maintaining member 55 consists of a base portion 56 and arm portions 57*a* and 57*b.* The path-maintaining member 45 has a length that is sufficient to allow the arm portions 47*a* and 47*b* to be fitted into the recessed sections 34 of the outer curvature portion 21 when the path-maintaining member 45 is bent. Further, the path-maintaining member 55 has a length that is sufficient to allow the arm portions 57*a* and 57*b* to be fitted into the recessed sections 32 of the inner curvature portion 22 when the path-maintaining member 55 is bent. The path-maintaining members 45 and 55 are formed of a flexible metal or resin. If the material is metal, the path-maintaining member is formed so as to have a constant thickness by means of an extrusion molding method using an extrusion die (not shown), and if the material is resin, the path-maintaining member is formed so as to have a constant thickness by means of an injection molding method.

A description will be made of the case where the path-maintaining member 45 is fitted into the recessed section 34 of the outer curvature portion 21. As shown in FIG. 10B, the path-maintaining member 45 is bent such that the base portion 46 is placed along the outer curvature portion 21 while the corrugated tube 16 is maintained in a bent shape, and then the arm portions 47a and 47b are fitted into the recessed sections 34 of the outer curvature portion 21 of the corrugated tube 16. The arm portions 47a and 47b engage with the recessed sections 34, so that the path-maintaining member 45 is secured against the outer curvature portion 21. Then, after the path-maintaining member 45 is secured to the outer curvature portion 21, the tape 17 is wrapped around the bent part 20 of the corrugated tube 16 to cover the path-maintaining member 45. Like in the former embodiment, the tape 17 is wrapped around the bent part 20 by means of a half-lapping (see the enlarged view of FIG. 10B).

Although the embodiment of FIG. 10B is configured such that the arm portions 47a and 47b of the path-maintaining member 45 are fitted into the recessed sections 34 of the outer curvature portion 21 of the corrugated tube 16, the path-maintaining member 55 may be used in place of the path-maintaining member 45 such that the arm portions 57a and 57b are fitted into the recessed sections 32 of the inner curvature portion 22 of the corrugated tube 16.

Next, a description will be made of the case where the path-maintaining members 45 and 55 are fitted into the recessed sections 34 and 32 of the outer and inner curvature portions 21 and 22. As shown in FIG. 10C the path-maintaining members 45 and 55 are bent such that the base portions 46 and 56 are placed along the outer and inner curvature portions 21 and 22 while the corrugated tube 16 is maintained in a bent shape, and then the arm portions 47a and 47b are fitted into the recessed sections 34 of the outer curvature portion 21 and at the same time, the arm portions 57a and 57b are fitted into the recessed sections 32 of the inner curvature portion 22. The arm portions 47a and 47b engage with the recessed sections 34 so that the path-maintaining member 45 is secured against the outer curvature portion 21, and the arm portions 57a and 57b also engage with the recessed sections 32 so that the path-maintaining member 55 is secured against the inner curvature portion 22.

Then, after the path-maintaining members 45 and 55 are secured to the outer and inner curvature portions 21 and 22, respectively, the tape 17 is wrapped around the bent part 20 of the corrugated tube 16 to cover the path-maintaining members 45 and 55. Similar to the configuration described above, the tape 17 is wrapped around the bent part 20 by means of a half-lapping (see the enlarged view of FIG. 10C).

According to this modified embodiment, since the tape 17 is wrapped around the substantially U-shaped path-maintaining members 45 and 55, which are simple in structure, while being fitted into the recessed sections 34 and 32 of the corrugated tube 16, the bent shape of the corrugated tube is maintained. That is, the bent shape of the corrugated tube can be maintained with a simple process.

As set forth from the foregoing, the wire harness of the embodiments can be simply provided with the flexible corrugated tube as an sheathing member for a conduction path while maintaining a desired shape of the corrugated tube with low-cost and wide-applicability configuration that does not require a protector. Further, since the wire harness of the embodiments uses a standard element (replaceable element), called a tape, as a substitute for a resin-formed protector in order to fix the path-maintaining members and the sheathing member, which have been previously bent, the wire harness does not require dedicated part and die for a vehicle. Thus, this contributes to a reduction in the manufacturing cost of the wire harness.

Here, the wire harness according to embodiments (1) to (3) of the present invention will be described in brief.

The wire harness 9 of the embodiment (1) includes a corrugated tube 16 as a tubular sheathing member which covers at least one electric wire 18 as a conduction path, and at least one flat-type path-maintaining member 25 and 26 (35 and 36, or 45 and 55) which is formed into a shape corresponding to the shape of a bent part 20 formed where the corrugated tube 16 is bent. Further, a tape 17 is wrapped around the path-maintaining member 25 while the path-maintaining member is placed along the bent part 20.

The wire harness 9 of the embodiment (2) is configured such that the path-maintaining members 25 and 26 have less flexibility than the corrugated tube 16.

The wire harness 9 of the embodiment (3) is configured such that the widths of the path-maintaining members in the diametric direction of the corrugated tube 16 are smaller than the width of the corrugated tube 16 in the diametric direction.

While the invention has been described with reference to exemplary embodiments, it will be understood by those skilled in the art that various changes may be made and equivalents may be substituted for elements thereof without departing from the scope of the invention.

For example, although the path-maintaining member 25 is a member that is preferably less flexible than the corrugated tube 16, the path-maintaining member may be a member that is similarly or more flexible to or than the corrugated tube 16.

This application is based on the Japanese patent application (patent application No. 2011-160138) filed on Jul. 21, 2011, the contents of which are incorporated herein by reference.

Industrial Applicability

The wire harness according to the present invention is advantageous in that an sheathing member can be maintained in a desired shape.

REFERENCE NUMERALS LIST

1: Hybrid vehicle
2: Engine
3: Motor unit
4: Inverter unit
5: Battery
6: Engine room
7: Rear portion of vehicle
8: High-voltage wire harness
9: Wire harness
10: Middle portion
11: Under-floor of vehicle
12: Junction block
13: Rear end
14: Front end
16: Corrugated tube (Sheathing member)
17: Tape
18: Electric wire (Conduction path)
19: Electromagnetic shield
20: Bent part
21: Outer curvature portion
22: Inner curvature portion
23: Planar member
25: Path-maintaining member (Outer side)
26: Path-maintaining member (Inner side)

35: Path-maintaining member (Outer side)
36: Path-maintaining member (Inner side)
45: Path-maintaining member (Outer side)
55: Path-maintaining member (Inner side)

The invention claimed is:

1. A wire harness comprising:
   a tubular sheathing member that covers at least one conduction path; and
   at least one path-maintaining member that is formed in a plate shape corresponding to a bent part formed by bending the sheathing member,
   wherein a tape is wrapped around the whole of the bent part while the path-maintaining member is placed along the bent part.

2. The wire harness according to claim 1, wherein the path-maintaining member has less flexibility than the sheathing member.

3. The wire harness according to claim 1, wherein a width of the path-maintaining member in a diametric direction of the sheathing member is smaller than a width of the sheathing member in the diametric direction.

4. The wire harness according to claim 1, wherein the path-maintaining member includes an inner path-maintaining member which contacts an inner bent part of the tubular sheathing member and an outer path-maintaining member which contacts an outer bent part of the tubular sheathing member.

* * * * *